United States Patent [19]

Ogawa

[11] Patent Number: 5,666,244
[45] Date of Patent: Sep. 9, 1997

[54] ROTARY ACTUATOR ASSEMBLY IN A DISK DRIVE HAVING A MAGNETIC ACTUATOR ARM LATCH

[75] Inventor: Yoshinori Ogawa, Kawasaki, Japan

[73] Assignee: Fujitsu Limited, Kawasaki, Japan

[21] Appl. No.: 709,528

[22] Filed: Sep. 6, 1996

Related U.S. Application Data

[63] Continuation of Ser. No. 347,048, Nov. 30, 1994, abandoned.

[30] Foreign Application Priority Data

Mar. 14, 1994 [JP] Japan ............... 6-042249

[51] Int. Cl.$^6$ ..................... G11B 21/22
[52] U.S. Cl. ..................... 360/106; 360/105
[58] Field of Search ............... 360/106, 105, 360/97.01

[56] References Cited

U.S. PATENT DOCUMENTS

| | | | |
|---|---|---|---|
| 4,805,055 | 2/1989 | Wright | 360/106 |
| 4,947,274 | 8/1990 | Casey et al. | 360/105 |
| 5,005,095 | 4/1991 | Wagner | 360/106 |
| 5,365,389 | 11/1994 | Jabbari et al. | 360/105 |

FOREIGN PATENT DOCUMENTS

| | | |
|---|---|---|
| 61-4456 | 1/1986 | Japan . |
| 62-107666 | 5/1987 | Japan . |
| 1126150 | 5/1989 | Japan . |
| 1211284 | 8/1989 | Japan . |
| 467477 | 3/1992 | Japan . |
| 4302877 | 10/1992 | Japan . |
| 595663 | 4/1993 | Japan . |

*Primary Examiner*—Robert S. Tupper
*Assistant Examiner*—Kevin M. Watkins
*Attorney, Agent, or Firm*—Greer, Burns & Crain, Ltd.

[57] ABSTRACT

A rotary actuator assembly in a magnetic disk drive unit capable of simultaneously realizing at low costs a reliable lock mechanism for an actuator and the improvement in gap magnetic flux density at both ends in a moving range of the actuator. The rotary actuator assembly includes a base; an actuator arm subassembly rotatably mounted on the base, the subassembly having one end supporting a plurality of magnetic heads and another end supporting a moving coil; and a magnetic circuit fixed to the base, the magnetic circuit constituting a voice coil motor in combination with the moving coil. Further, a latch magnet for locking the actuator arm subassembly is fixed to either the base or the magnetic circuit. The latch magnet has a magnetic pole directed to a center yoke of the magnetic circuit, and the magnetic pole has the same polarity as that of surfaces of an inner magnet and an outer magnet of the magnetic circuit opposed to the center yoke.

20 Claims, 12 Drawing Sheets

ROTARY ACTUATOR ASSEMBLY IN A DISK DRIVE HAVING A MAGNETIC ACTUATOR ARM LATCH

RELATED APPLICATION

This is a continuation of application Ser. No. 08/347,048 filed on Nov. 30, 1994, now abandoned.

BACKGROUND OF THE INVENTION

1. Field of the Invention

The present invention relates to a rotary actuator assembly in a magnetic disk drive unit or an optical disk drive unit.

2. Description of the Related Art

In recent years, a magnetic disk drive unit as a kind of external storage for a computer has been desired with reduced size and enlarged capacity. In association with a reduction in size of the magnetic disk drive unit, it has been demanded to manufacture a compact, high-performance, low-cost magnetic circuit to be used in a voice coil motor (VCM) for driving an actuator assembly to be mounted in the magnetic disk drive unit. Further, a carriage lock or an actuator lock is generally used to prevent damage to magnetic disks in transporting the magnetic disk drive unit, and a low-cost reliable actuator lock is desired.

The actuator lock operates to lock the actuator assembly near an innermost cylinder or an outermost cylinder of the magnetic disks. In recent years, the actuator lock employing a solenoid or the like has become a primary actuator lock. However, when a trouble such as malfunction of the solenoid occurs, the magnetic disks are possibly damaged to cause a reduction in reliability of the magnetic disk drive unit.

In the magnetic circuit used in the voice coil motor (VCM) for driving the actuator assembly in the magnetic disk drive unit, it is desirable to ensure a constant magnetic flux density in gaps in the range of swinging of a coil. In the conventional magnetic circuit, however, the nearer the coil is moved to both ends of the magnetic circuit, the more the gap magnetic flux density is reduced. Although this problem can be solved to some extent by extending an inner magnet and an outer magnet in their circumferential direction, the volume of each magnet is increased to cause an increase in cost and the gap magnetic flux density over the range of swinging of the coil is reduced because of yoke saturation. Further, it is known that a short coil is located in the gaps of the magnetic circuit to quicken the rising of VCM current at seeking acceleration.

The actuator lock mechanism employing the solenoid as mentioned above has a problem that the trouble such as malfunction of the solenoid causes damage to the magnetic disks, thus reducing the reliability of the magnetic disk drive unit. Further, there is another problem that the solenoid is relatively costly. It is desirable for the actuator assembly in the magnetic disk drive unit to suppress a reduction in gap magnetic flux density and obtain a fixed force constant irrespective of the position of the actuator assembly on any cylinder of the magnetic disks, so as to obtain a stable seeking performance and positioning performance.

According to the provision of the short coil in the gaps of the magnetic circuit for the purpose of quickening the rising of VCM current at seeking acceleration as mentioned above, it is necessary to widen the gaps by a space occupied by the short coil. As a result, the force constant of the VCM is generally reduced by the space. Compensation of such a reduction in the force constant requires enlargement of the magnetic circuit. However, since a form factor of the magnetic circuit is limited, it is difficult to realize the compensation of the reduction in the force constant.

SUMMARY OF THE INVENTION

It is therefore an object of the present invention to provide a rotary actuator assembly in a disk drive unit which can realize at low costs both a reliable lock mechanism for an actuator and measures against a reduction in gap magnetic flux density at both ends of the magnetic circuit.

It is another object of the present invention to provide a rotary actuator assembly in a disk drive unit which can obtain a stable large force constant of the VCM over all cylinders and can improve the rising characteristic of the VCM current.

In accordance with an aspect of the present invention, there is provided a rotary actuator assembly in a disk drive unit, comprising a base; an actuator arm subassembly rotatably mounted on said base, said subasssembly having one end supporting a plurality of heads and another end supporting a moving coil; a magnetic circuit fixed to said base, said magnetic circuit constituting a voice coil motor in combination with said moving coil, said magnetic circuit comprising an E-shaped main yoke having an inner yoke, a center yoke, and an outer yoke, an inner magnet mounted on an outer circumferential surface of said inner yoke opposed to said center yoke, an outer magnet mounted on an inner circumferential surface of said outer yoke opposed to said center yoke, and a side yoke attached to said main yoke by magnetic forces of said inner magnet and said outer magnet; and a latch magnet fixed to one of said base and said magnetic circuit, for locking said actuator arm subassembly, said latch magnet having a magnetic pole directed to said center yoke, said magnetic pole having the same polarity as that of surfaces of said inner magnet and said outer magnet opposed to said center yoke, said latch magnet being located at a position such that when said heads are disposed near one of an inner cylinder and an outer cylinder of disks, said moving coil passes a magnetic flux directed from said latch magnet to said center yoke, to thereby strengthen a thrust of said voice coil motor.

Preferably, a magnetic member to be magnetically attracted to said latch magnet is mounted on the other end of said actuator arm subassembly. The latch magnet generates a thrust at an ineffective portion of the moving coil.

In accordance with another aspect of the present invention, there is provided a rotary actuator assembly in a disk drive unit, comprising a base; an actuator arm subassembly rotatably mounted on said base, said subassembly having one end supporting a plurality of heads and another end supporting a moving coil; a magnetic circuit fixed to said base, said magnetic circuit constituting a voice coil motor in combination with said moving coil, said magnetic circuit comprising an E-shaped main yoke having an inner yoke, a center yoke, and an outer yoke, an inner magnet mounted on an outer circumferential surface of said inner yoke opposed to said center yoke, an outer magnet mounted on an inner circumferential surface of said outer yoke opposed to said center yoke, and a side yoke attached to said main yoke by magnetic forces of said inner magnet and said outer magnet, said center yoke being formed at its substantially central portion with a shallow groove extending in the same direction as that of winding of said moving coil; and a short coil embedded in said shallow groove, said short coil being formed of a highly conductive material.

According to one aspect of the present invention, the latch magnet constituting a lock mechanism for the actuator assembly generates a thrust at the ineffective portion of the moving coil. Therefore, the latch magnet also functions to compensate a reduction in gap magnetic flux density at both ends of the magnetic circuit as a stator of the VCM.

According to another aspect of the present invention, although the peak of the gap magnetic flux density is lowered, the concentration of the magnetic flux in the yoke can be relaxed by the lowering of the peak, thereby increasing the gap magnetic flux density at both ends of the magnetic circuit. The short coil is embedded in the shallow groove formed on the center yoke without widening the gaps in the magnetic circuit. Therefore, the rising characteristic of the VCM current can be improved without a reduction in gap magnetic flux density over the whole range of movement of the moving coil in the magnetic circuit.

The above and other objects, features and advantages of the present invention and the manner of realizing them will become more apparent, and the invention itself will best be understood from a study of the following description and appended claims with reference to the attached drawings showing some preferred embodiment of the invention.

DETAILED DESCRIPTION OF THE PREFERRED EMBODIMENTS

Figure 1:
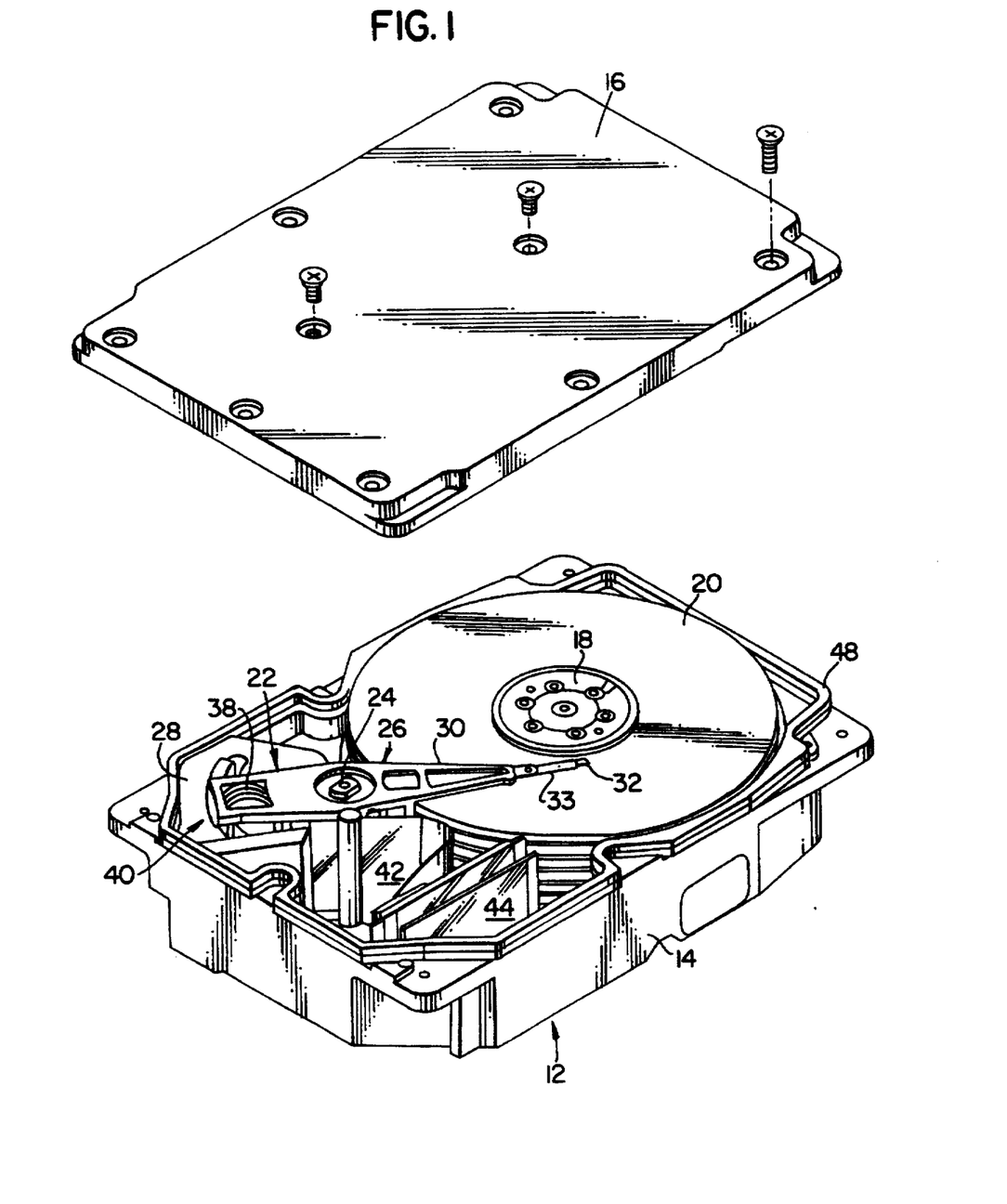
FIG. 1 is a perspective view of a magnetic disk drive unit employing the actuator assembly according to the present invention.

Referring to FIG. 1, there is shown a perspective view of a magnetic disk drive unit including a rotary actuator assembly according to the present invention. Reference numeral 12 denotes a housing (enclosure) composed of a base 14 and a cover 16. A spindle hub 18 to be rotatably driven by an inner hub motor not shown is provided on the base 14. A plurality of magnetic disks 20 and spacers not shown are alternately stacked and mounted on the spindle hub 18. That is, the plurality of magnetic disks 20 are regularly spaced from each other and are mounted on the spindle hub 18.

Figure 3:
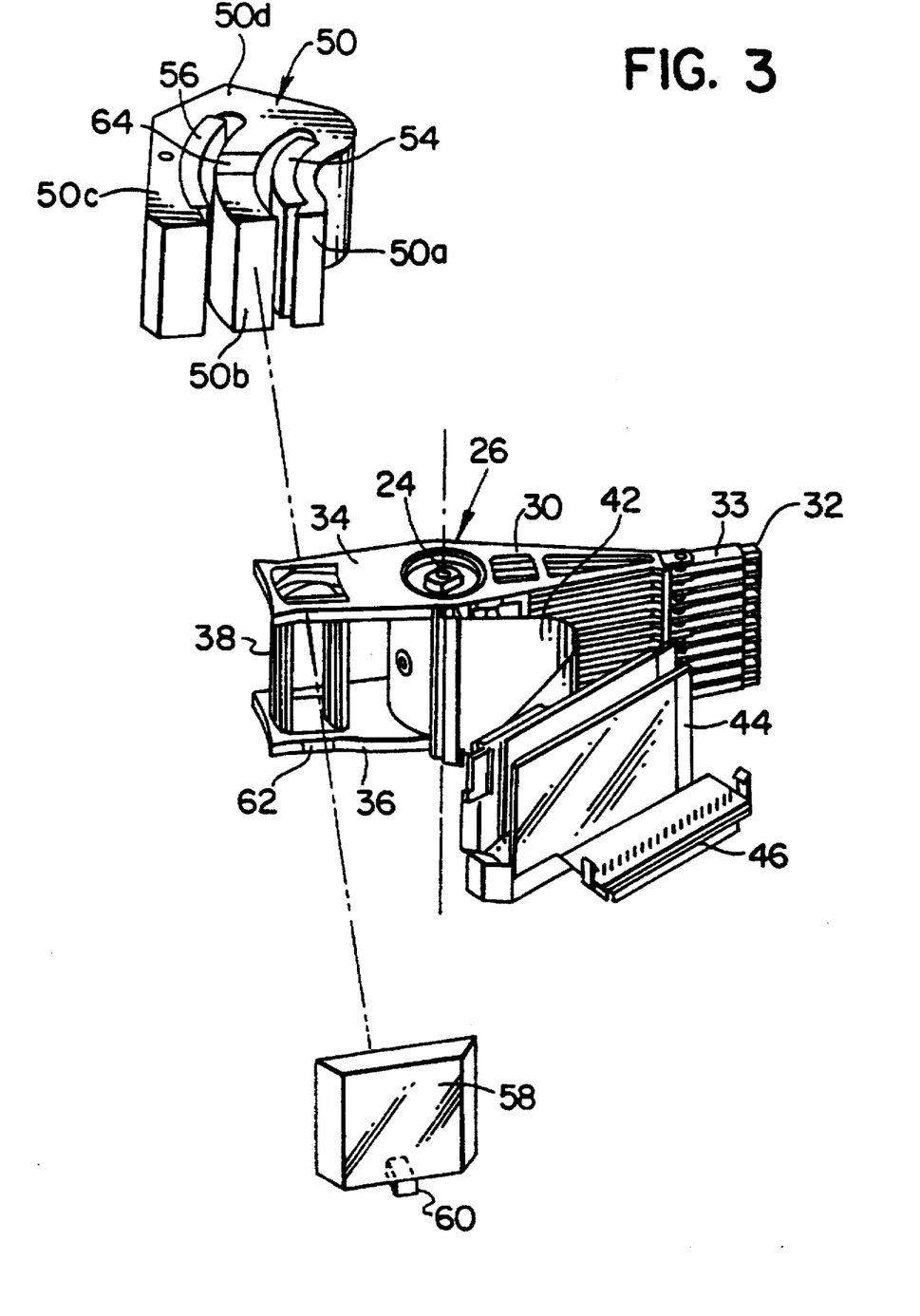
FIG. 3 is an exploded perspective view of a first preferred embodiment of the actuator assembly according to the present invention.

Reference numeral 22 denotes a rotary actuator assembly composed of an actuator arm assembly 26 and a magnetic circuit 28. As best shown in FIG. 3, the actuator arm assembly 26 is rotatably mounted on a shaft 24 fixed to the base 14, and includes a plurality of actuator arms 30 extending in one direction from the center of rotation and a pair of coil supporting members 34 and 36 extending in another direction opposite to the direction of extension of the actuator arms 30.

A spring arm 33 supporting a magnetic head 32 is fixed to an end portion of each actuator arm 30. A moving coil 38 is supported by the pair of coil supporting members 34 and 36 and is inserted in two gaps of the magnetic circuit 28. The magnetic circuit 28 and the moving coil 38 constitute a voice coil motor 40. Reference numeral 42 denotes a flexible printed wiring sheet for taking out a signal from each magnetic head 32. The flexible printed wiring sheet 42 is fixed at its one end by a fixing member 44 and is electrically connected to a connector 46.

Figure 2:
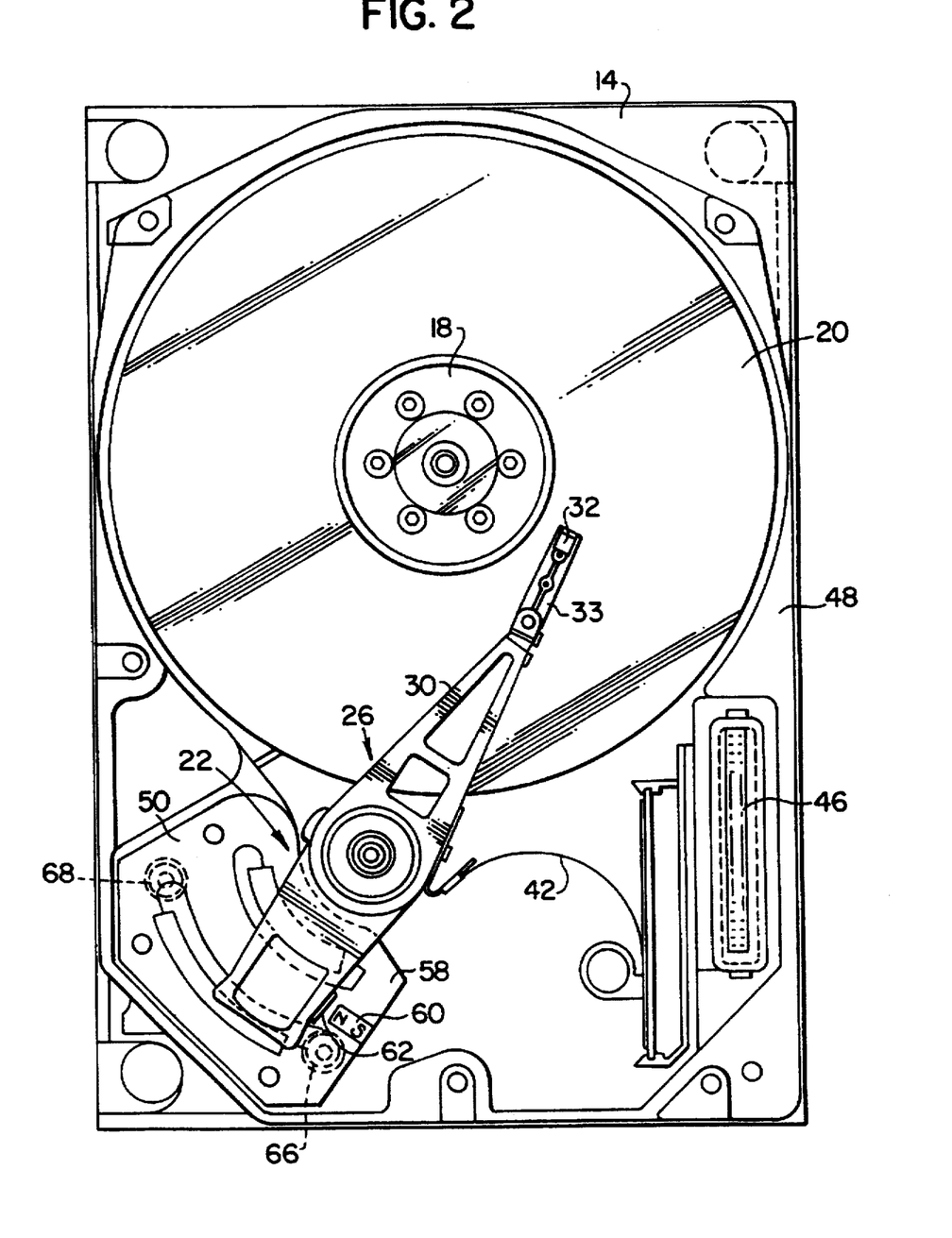
FIG. 2 is a top plan view of the magnetic disk drive unit shown in FIG. 1.

Referring to FIGS. 1 and 2, an annular packing assembly 48 is mounted on the base 14. The cover 16 is fixed to the base 14 by screws with the annular packing assembly 48 interposed therebetween, thus sealing the housing 12. As shown by broken lines in FIG. 2, a first stopper 66 for stopping the actuator arm assembly 26 at a position near an innermost cylinder of the magnetic disks 20 and a second stopper 68 for stopping the actuator arm assembly 26 at a position near an outermost cylinder of the magnetic disks 20 are fixed to the base 14 in such a manner as to project therefrom and abut against the coil supporting member 36.

Referring to FIG. 3, the magnetic circuit 28 includes an E-shaped main yoke 50 and a side yoke 58. The main yoke 50 has an inner yoke 50a, a center yoke 50b, an outer yoke 50c, and a connecting portion 50d connecting them together. An inner magnet 54 is mounted on a surface of the inner yoke 50a opposed to the center yoke 50b, and an outer magnet 56 is mounted on a surface of the outer yoke 50c opposed to the center yoke 50b.

As will be hereinafter described, a shallow groove is formed at a substantially central portion of the center yoke 50b, and a short coil 64 is embedded in the shallow groove. A latch magnet 60 is fixed to a bottom surface of the side yoke 58. A soft magnetic plate 62 such as a rolled steel plate to be magnetically attracted to the latch magnet 60 is bonded to a side surface of the coil supporting member 36.

Figure 4:
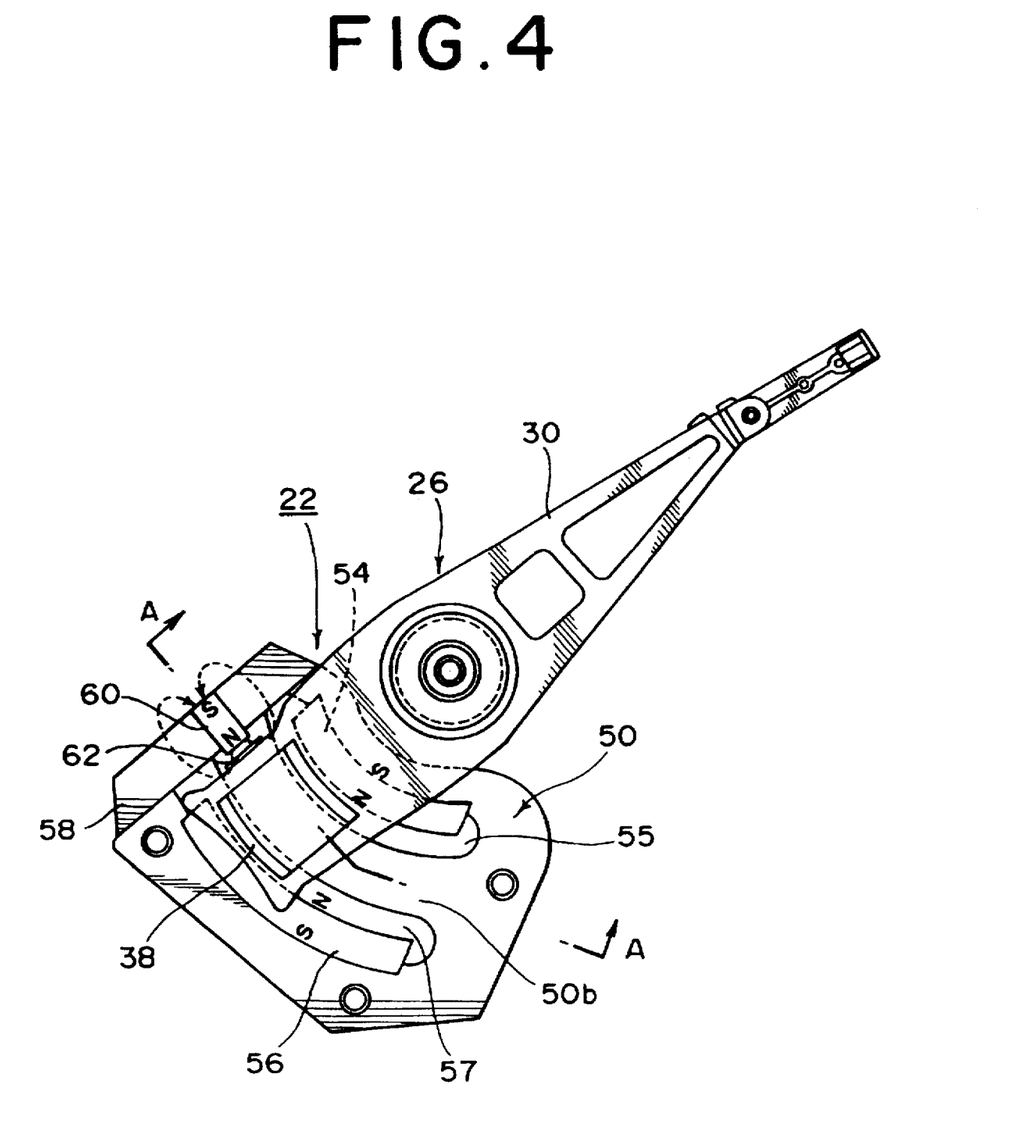
FIG. 4 is a bottom plan view of the first preferred embodiment.

FIG. 4 shows a bottom plan view of the actuator assembly with the short coil 64 not shown. The moving coil 38 is inserted in an inner gap 55 and an outer gap 7. An effective portion of the moving coil 38 as a rotor of the VCM 40 is disposed in the inner gap 55 and the outer gap 57. The effective portion of the moving coil 38 extends substantially parallel to the axis of rotation of the actuator arm assembly 26, and an ineffective portion of the moving coil 38 extends substantially perpendicular to the axis of rotation of the actuator arm assembly 26.

Figure 5:
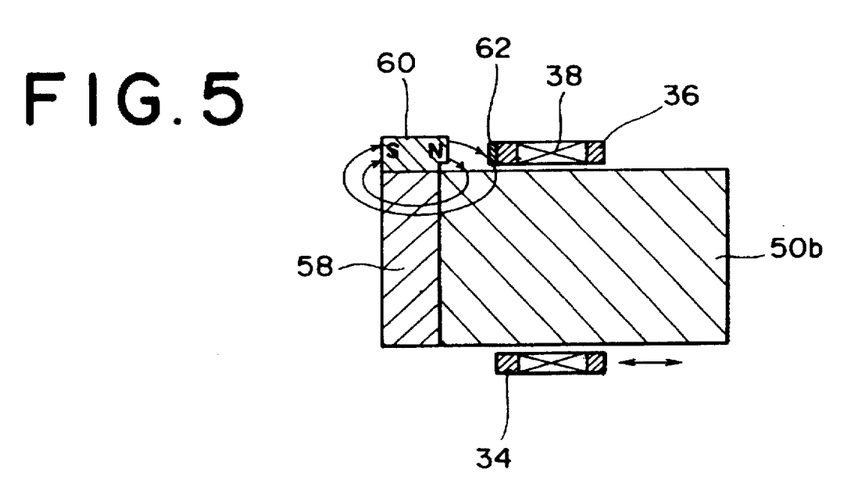
FIG. 5 is a cross section taken along the line A—A in FIG. 4.

As shown in FIG. 4, the latch magnet 60 is fixed by bonding to the bottom surface of the side yoke 58 in such a manner that a magnetic pole of the latch magnet 60 is directed to the center yoke 50b. The polarity of the magnetic pole is the same as that of the surfaces of the inner magnet 54 and the outer magnet 56 opposed to the center yoke 50b. As best shown in FIG. 5, the magnetic plate 62 bonded to the side surface of the coil supporting member 36 is opposed to the magnetic pole surface of the latch magnet 60 with a space defined therebetween under the condition where the coil supporting member 36 abuts against the first stopper (inner stopper) 66.

With this arrangement, the actuator arm assembly 26 abutting against the inner stopper 66 is locked by an attractive force between the latch magnet 60 and the magnetic plate 62. The actuator arm assembly 26 in such a locked condition is unlocked by supplying a current to the VCM 40 so as to generate a thrust in an outer direction of the magnetic disks 20 at starting of the actuator arm assembly 22.

When the magnetic heads 32 are in an on track condition near an inner data cylinder in a data zone of the magnetic disks 20, a magnetic flux directed from the latch magnet 60 to the center yoke 50b passes a part of the ineffective portion (horizontal portion) of the moving coil 38, so that a thrust is also generated in the ineffective portion of the moving coil 38 to strengthen the thrust of the voice coil motor 40. The nearer the actuator arm assembly 26 is moved in an inner direction of the magnetic disks 20, the greater the thrust becomes to compensate a reduction in gap magnetic flux density Bg near the inner data cylinder.

Figure 6:
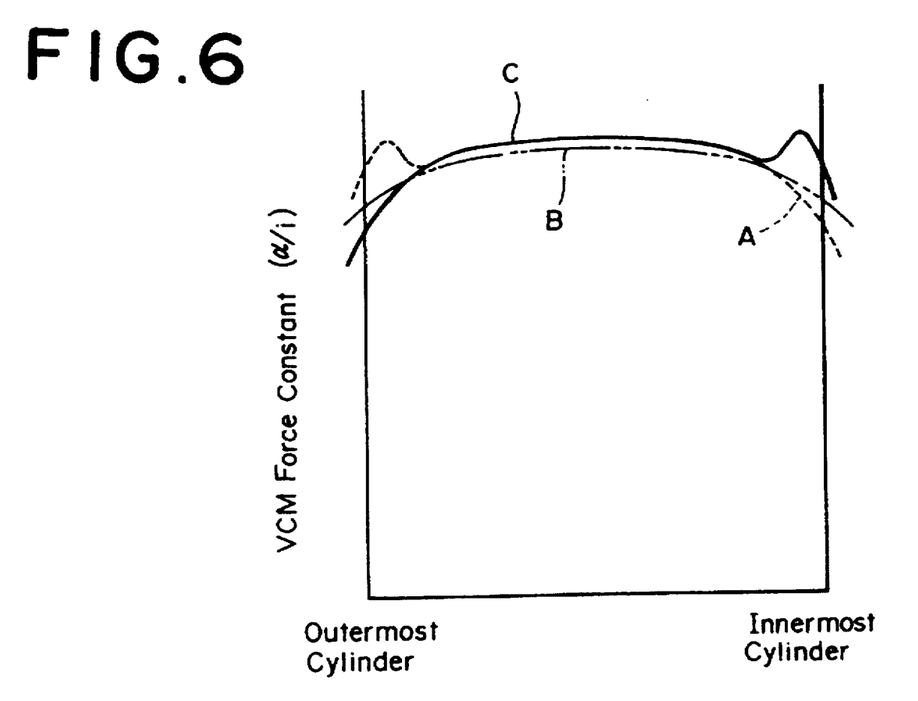
FIG. 6 is a graph showing a characteristic of a voice coil motor.

Referring to FIG. 6, there is shown a characteristic of the VCM according to the present invention in comparison with the related art. In FIG. 6, α represents an acceleration of the actuator arm assembly, and i represents a coil current. In a magnetic circuit employing an E-shaped main yoke, the more the actuator arm assembly approaches either end of the magnetic circuit (i.e., a position near the innermost cylinder or a position near the outermost cylinder), the more the gap magnetic flux density Bg is usually reduced. Accordingly, the force constant of the VCM decreases near the innermost cylinder and near the outermost cylinder as shown by a curve A. This problem can be solved to some extent by extending the inner magnet and the outer magnet in the circumferential direction. However, the gap magnetic flux density Bg over the range between the innermost cylinder and the outermost cylinder is reduced because of yoke saturation. As a result, the force constant of the VCM generally decreases as shown by a curve B.

In this preferred embodiment, the latch magnet 60 generates a thrust at the ineffective portion of the coil 38 near the innermost cylinder, so that the force constant of the VCM near the innermost cylinder can be improved as shown by a curve C. As shown by a broken line at the left end in FIG. 6, the force constant of the VCM near the outermost cylinder can also be improved by providing a similar latch magnet on the outer cylinder side as will be hereinafter described.

Figure 7:
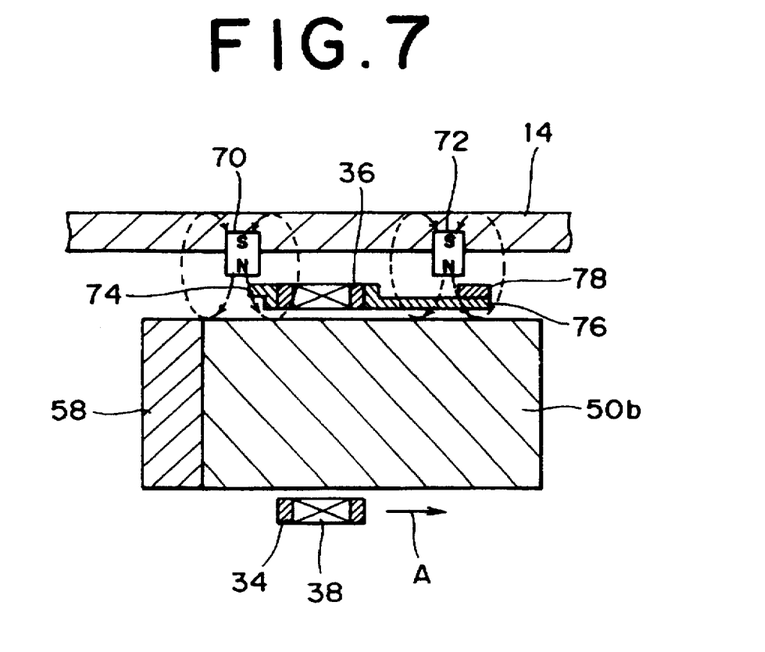
FIG. 7 is a sectional view similar to FIG. 5, showing a second preferred embodiment of the actuator assembly according to the present invention.

A second preferred embodiment of the present invention will now be described with reference to FIG. 7. Also in this preferred embodiment, the actuator arm assembly is locked when it abuts against the inner stopper 66. As shown in FIG. 7, two latch magnets 70 and 72 are fixed to the base 14 in such a manner that a magnetic pole of each latch magnet is directed to the center yoke 50b. The polarity of the magnetic pole of each latch magnet is the same as that of the surfaces of the inner magnet 54 and the outer magnet 56 opposed to the center yoke 50b.

The latch magnet 70 is located so as to compensate a reduction in gap magnetic flux density Bg near the inner data cylinder, and the latch magnet 72 is located so as to compensate a reduction in gap magnetic flux density Bg near the outer data cylinder. FIG. 7 shows a condition where the actuator arm assembly is disposed near the innermost cylinder. A soft magnetic plate 74 is bonded to the coil supporting member 36 so as to be opposed to the latch magnet 70. An arm 76 is bonded at its one end to the coil supporting member 36, and a soft magnetic plate 78 is bonded to the other end of the arm 76 so as to be opposed to the latch magnet 72. In this condition shown, the soft magnetic plates 74 and 78 are magnetically attracted to the latch magnets 70 and 72, respectively, thereby reliably locking the actuator arm assembly.

When the actuator arm assembly is swung in a direction depicted by an arrow A in FIG. 7 to come near the outermost cylinder, the magnetic flux directed from the latch magnet 72 to the center yoke 50b passes a part of the ineffective portion of the coil 38 to generate a thrust at the ineffective portion of the coil 38, thereby compensating a reduction in gap magnetic flux density Bg near the outermost cylinder. Similarly to the first preferred embodiment, the actuator arm assembly abutting against the inner stopper 66 is locked by the attractive force between the latch magnet 70 and the soft magnetic plate 74 and the attractive force between the latch magnet 72 and the soft magnetic plate 78. At starting of the actuator assembly, this locked condition is canceled by supplying a current to the VCM so as to generate a thrust in the outer direction of the magnetic disks 20.

Figure 8:
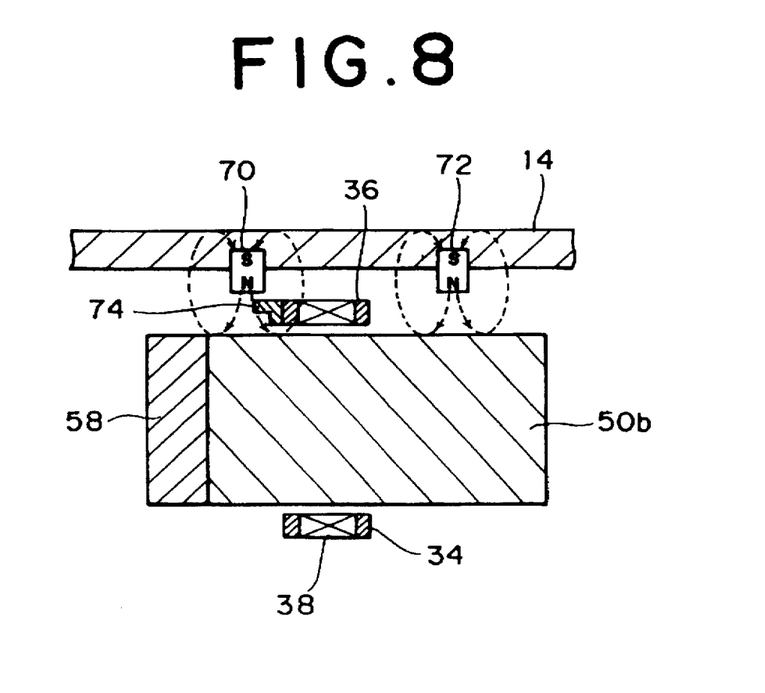
FIG. 8 is a sectional view similar to FIG. 5, showing a third preferred embodiment of the actuator assembly according to the present invention.

Referring to FIG. 8, there is shown a sectional view of a third preferred embodiment of the present invention. This preferred embodiment is similar to the second preferred embodiment with the exception that the arm 76 and the magnetic plate 78 are omitted. In this preferred embodiment, the magnet 72 has no locking function, but functions to only compensate a reduction in gap magnetic flux density Bg near the outermost cylinder. From this point of view, it should be proper to call the magnet 72 an auxiliary magnet.

Figure 9:
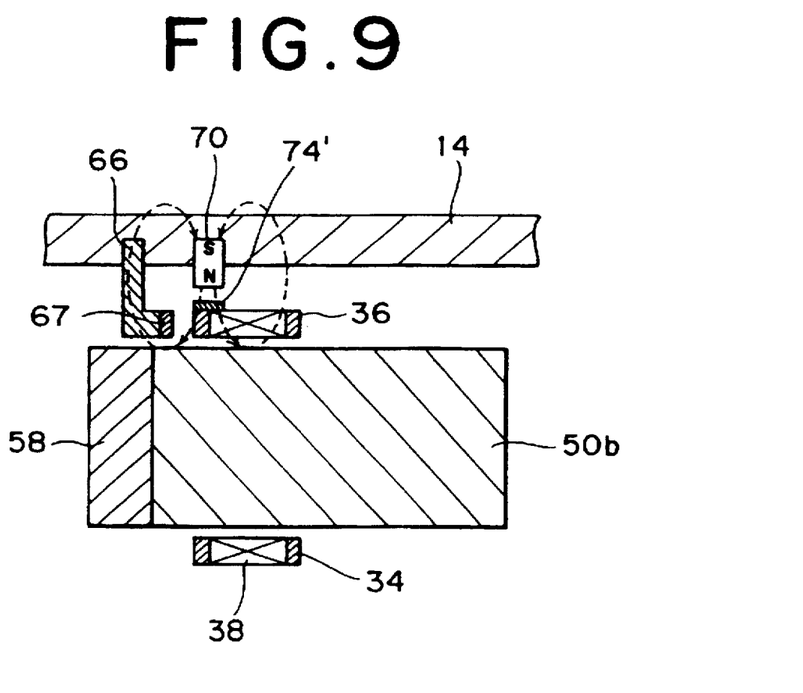
FIG. 9 is a sectional view similar to FIG. 5, showing a fourth preferred embodiment of the actuator assembly according to the present invention.

Referring to FIG. 9, there is shown a sectional view of a fourth preferred embodiment of the present invention. A rubber stop 67 is bonded to an end of the inner stopper 66 fixed to the base 14. A soft magnetic plate 74' is bonded to the coil supporting member 36 so as to be opposed to the latch magnet 70. In this preferred embodiment, the actuator arm assembly is locked by the latch magnet 70 at a position where the actuator arm assembly is slightly separate from the inner stopper 66 in the seeking direction. With this arrangement, when the magnetic heads 32 are adhered to the magnetic disks 20, this adhered condition of the magnetic heads 32 can be easily canceled by swinging the actuator arm assembly in the inner direction of the magnetic disks 20 to bring the actuator arm assembly into abutment against the rubber stop 67 bonded to the inner stopper 66.

Figure 10:
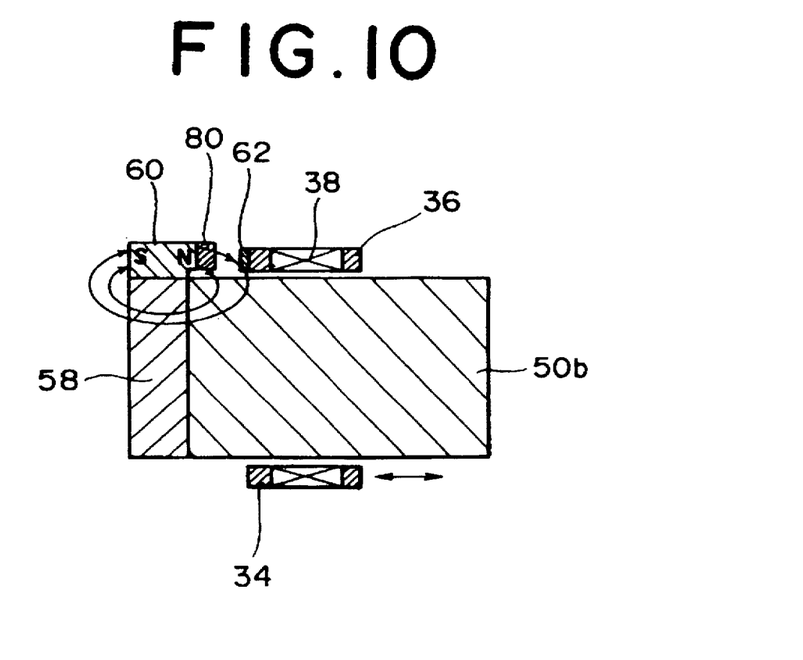
FIG. 10 is a sectional view similar to FIG. 5, showing a fifth preferred embodiment of the actuator assembly according to the present invention.

Referring to FIG. 10, there is shown a sectional view of a fifth preferred embodiment of the present invention. This preferred embodiment is a modification of the first preferred embodiment shown in FIG. 5. That is, an elastic member 80 such as a rubber member is bonded to an end of the latch magnet 60. In this preferred embodiment, the elastic member 80 bonded to the latch magnet 60 functions as a stopper, so that the inner stopper 66 may be omitted.

Figure 11:
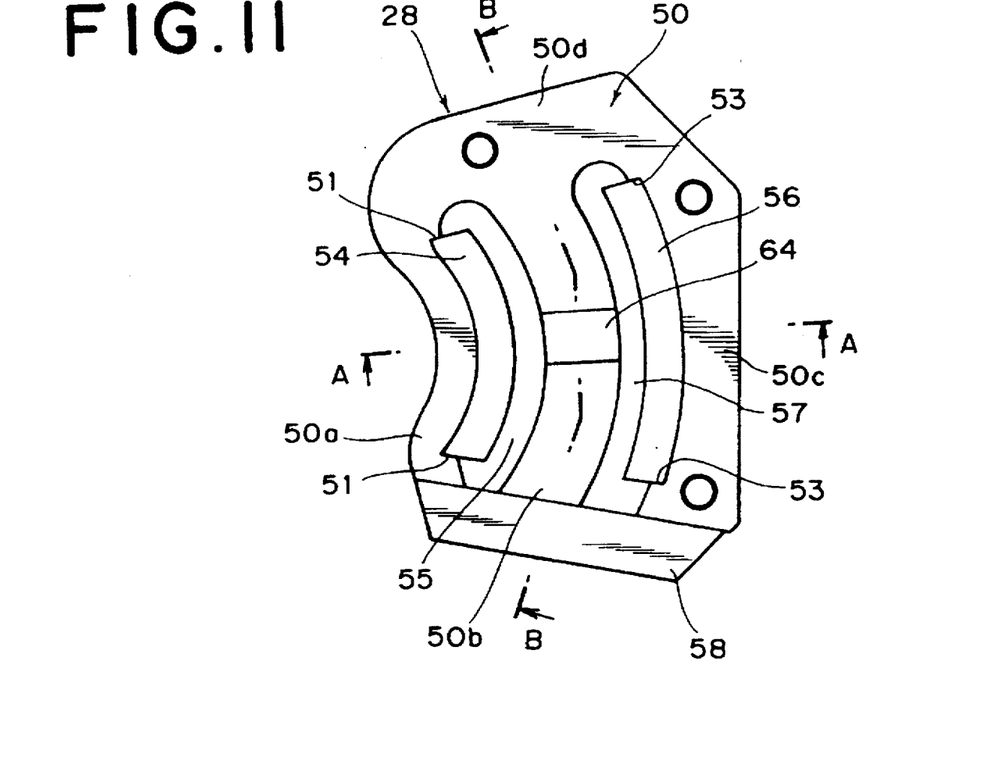
FIG. 11 is a top plan view of a first preferred embodiment of a magnetic circuit employed in the actuator assembly according to the present invention.

Now, a first preferred embodiment of the magnetic circuit suitable for use in the present invention will be described with reference to FIGS. 11 to FIGS. 15A and 15B. Referring primarily to FIG. 11, the main yoke 50 has an E-shaped configuration so that it is composed of the arcuate inner yoke 50a, the arcuate center yoke 50b, the arcuate outer yoke 50c, and the connecting portion 50d integrally connecting the inner yoke 50a, the center yoke 50b, and the outer yoke 50c.

Figure 12:
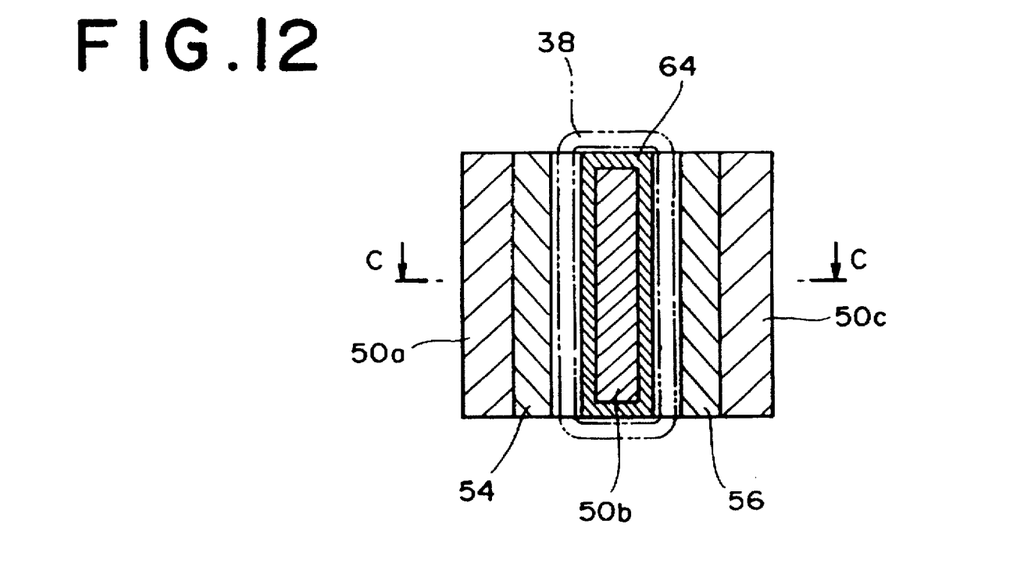
FIG. 12 is a cross section taken along the line A—A in FIG. 11.
Figure 13:
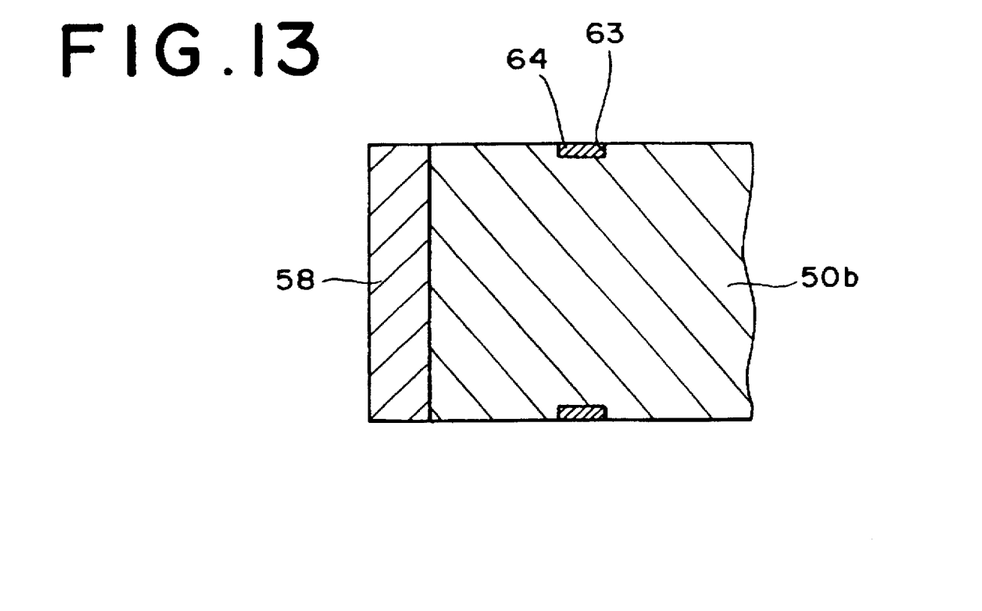
FIG. 13 is a cross section taken along the line B—B in FIG. 11.
Figure 14:
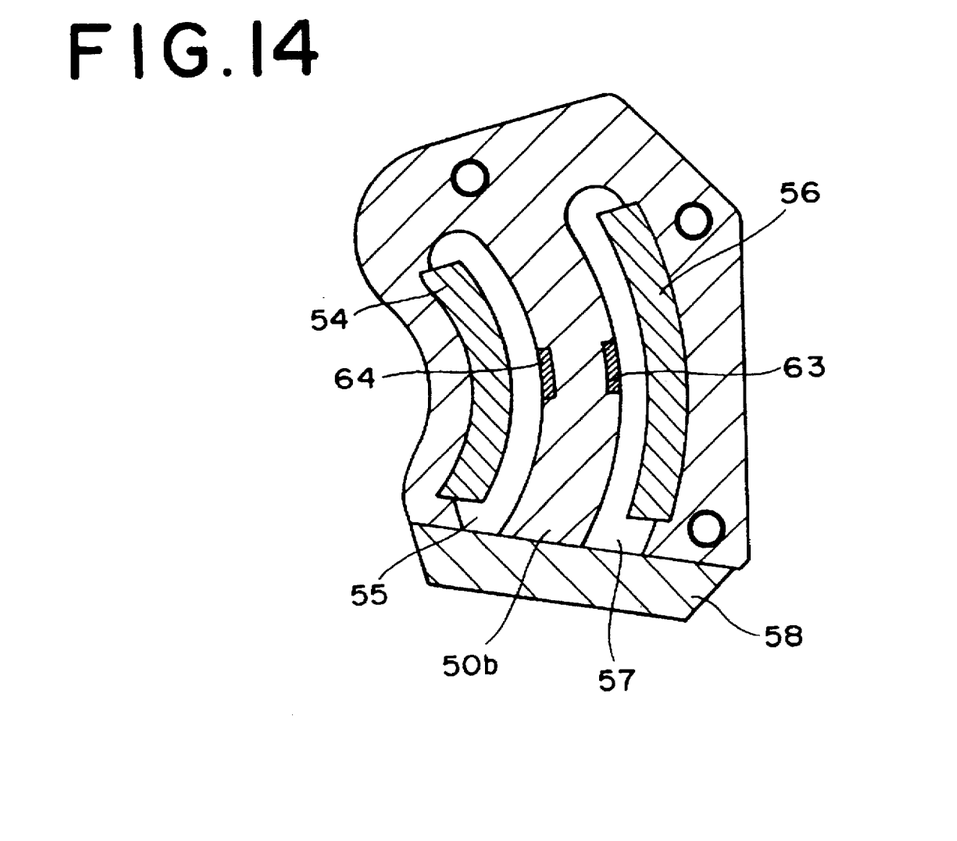
FIG. 14 is a cross section taken along the line C—C in FIG. 12.

An outer circumferential surface of the inner yoke 50a is formed with a pair of shoulders 51 against which both circumferential ends of the inner magnet 54 abut, thereby preventing the inner magnet 54 from sliding in its circumferential direction. An inner circumferential surface of the outer yoke 50c is formed with a pair of shoulders 53 against which both circumferential ends of the outer magnet 56 abut, thereby preventing the outer magnet 56 from sliding in its circumferential direction. The inner gap 55 is defined between the inner magnet 54 and the center yoke 50b, and the outer gap 57 is defined between the outer magnet 56 and the center yoke 50b. As shown in FIG. 12, the effective portion of the moving coil 38 is inserted into these gaps 55 and 57.

Figure 15A:
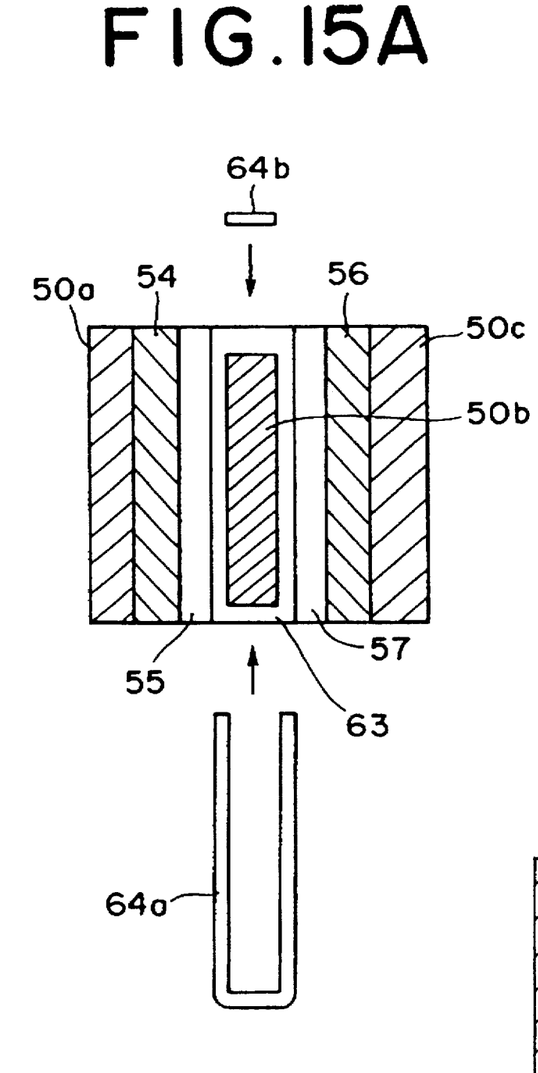
FIGS. 15A and 15B are vertical sectional views similar to FIG. 12, showing a mounting method for a short coil.

As best shown in FIG. 15A, a shallow groove 63 is formed at a central portion of the center yoke 50b. The shallow groove 63 extends in the same direction as the direction of winding of the moving coil 38. The short coil 64 formed of copper or the like is embedded in the shallow groove 63. The width of the short coil 64 is preferably set to a width such that when the moving coil 38 is disposed at the position of the innermost cylinder or the outermost cylinder, the effective portion of the coil 38 on the outer gap 57 side does not overlap the short coil 64.

Figure 15B:
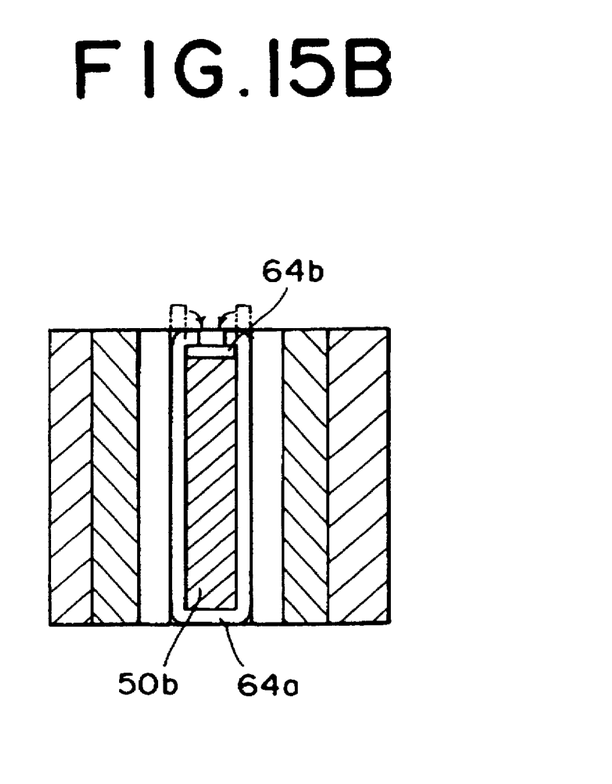

As shown in FIG. 15A, the short coil 64 is composed of a U-shaped member 64a formed of copper by pressing and a flat member 64b formed of copper by pressing. The U-shaped member 64a is inserted into the groove 63 from the lower side, and the flat member 64b is inserted into the groove 63 from the upper side. In this condition, both ends of the U-shaped member 64a are crimped to be fixed to the flat member 64b as shown in FIG. 15B.

Figure 16:
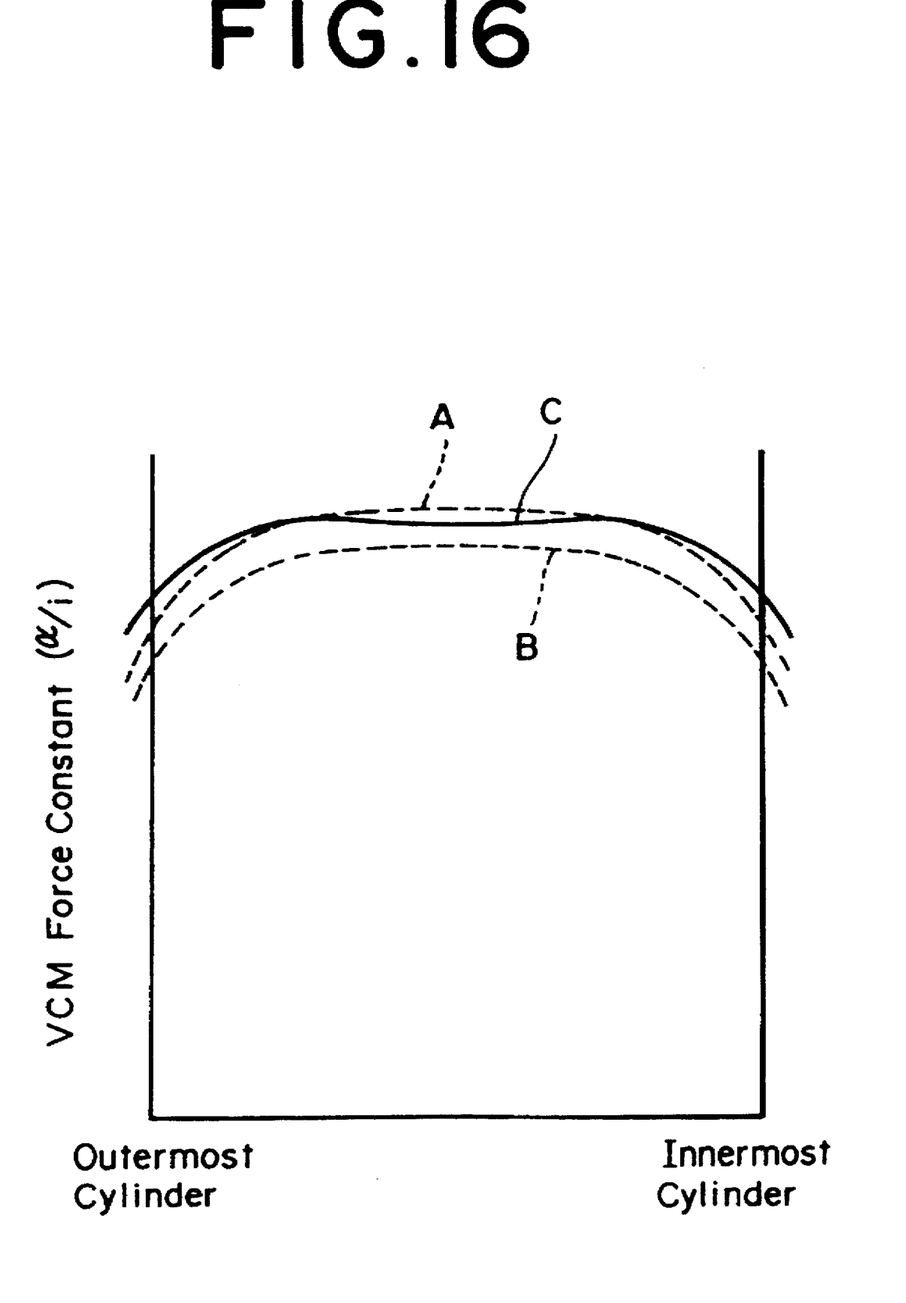
FIG. 16 is a graph showing a characteristic of a voice coil motor.

FIG. 16 shows a characteristic of the VCM employing the conventional magnetic circuit and a characteristic of the VCM employing the magnetic circuit according to this preferred embodiment. In general, it is desirable that a magnetic circuit employed in the VCM for driving the actuator assembly in the magnetic disk drive unit has a constant gap magnetic flux density Bg in the range of swinging of the moving coil. However, the nearer the moving coil is moved to either end of this range (i.e., near the innermost cylinder or near the outermost cylinder), the lower the gap magnetic flux density Bg becomes, so that the force constant of the VCM is lowered at and near both ends of this range as shown by a curve A in FIG. 16.

In the conventional magnetic circuit employing the short coil located in the inner gap and the outer gap, it is necessary to widen the inner gap and the outer gap by a space occupied by the short coil. Accordingly, the force constant of the VCM is generally reduced by this space as shown by a curve B in FIG. 16. To the contrary, in the magnetic circuit according to this preferred embodiment, the short coil 64 is embedded in the shallow groove 63 formed on the center yoke 50b, thereby eliminating the necessity of widening the inner gap 55 and the outer gap 57.

With this arrangement, although the peak of the gap magnetic flux density Bg is lowered, the concentration of magnetic flux in the yoke can be relaxed by the lowering of the peak to increase the gap magnetic flux density Bg at both ends of the moving range of the coil 38 (i.e., near the innermost cylinder and near the outermost cylinder). Accordingly, the magnetic circuit according to this preferred embodiment can improve the force constant of the VCM at both ends of the moving range as shown by a curve C in FIG. 16 though the force constant of the VCM at a central portion of the moving range is slightly reduced. Since the inner gap 55 and the outer gap 57 need not be widened as mentioned above, the gap magnetic flux density Bg in the whole moving range is not reduced and a rising characteristic of VCM current at seeking acceleration can be improved.

Figure 17:
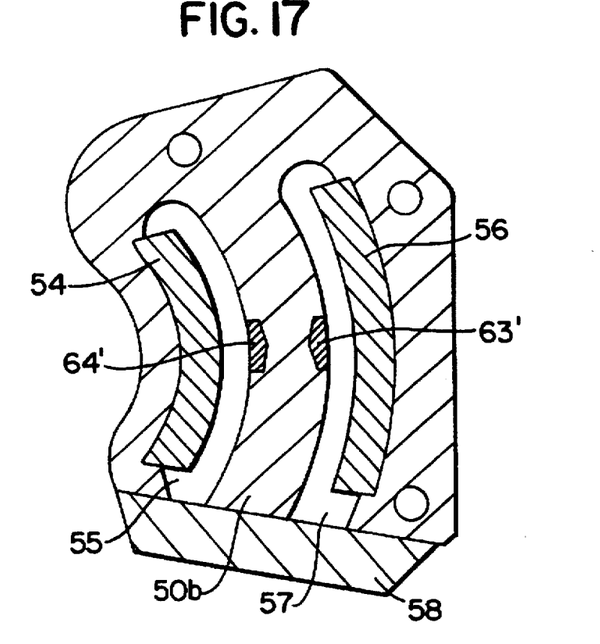
FIG. 17 is a horizontal sectional view similar to FIG. 14, showing a second preferred embodiment of the magnetic circuit.

Referring to FIG. 17, there is shown a horizontal sectional view of a second preferred embodiment of the magnetic circuit. In this preferred embodiment, a groove 63" having a V-shaped bottom surface is formed at a central portion of the center yoke 50b, and a short coil 64' having a shape corresponding to the shape of the groove 63' is embedded in this groove 63'. With this arrangement, the pap magnetic flux density Bg at both ends of the moving range of the coil 38 can be improved more than that in the first preferred embodiment shown in FIGS. 11 to 15A and 15B.

Figure 18:
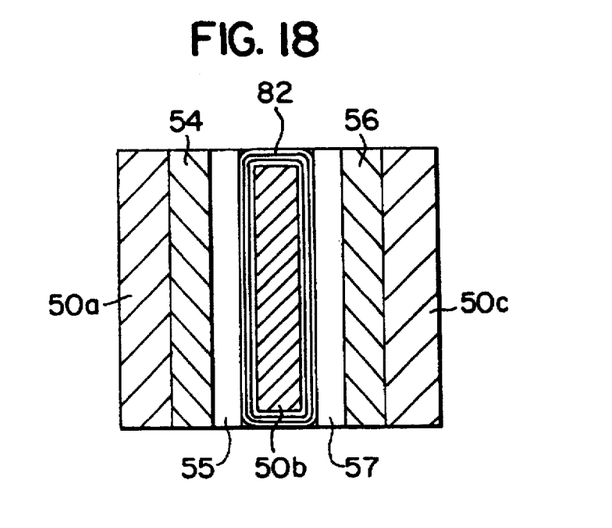
FIG. 18 is a vertical sectional view similar to FIG. 12, showing a third preferred embodiment of the magnetic circuit.

Referring to FIG. 18, there is shown a vertical sectional view of a third preferred embodiment of the magnetic circuit. In this preferred embodiment, an uncovered, or bare copper wire is wound plural times in the groove 63 to form a short coil 2. This preferred embodiment has an effect similar to that obtained in the first and second preferred embodiment shown in FIGS. 11 through 17.

As described above, the rotary actuator assembly according to the present invention can simultaneously realize a reliable lock mechanism for the actuator assembly and the improvement in pap magnetic flux density near the innermost cylinder or near the outermost cylinder. Moreover, the rotary actuator assembly according to the present invention can obtain a stable large force constant of the VCM over the range between the innermost cylinder and the outermost cylinder to improve the rising characteristic of VCM current at seeking acceleration.

What is claimed is:

1. A rotary actuator assembly in a disk drive unit having a disk mounted therein, comprising:

a base;

an actuator arm subassembly rotatably mounted on said base, said subassembly having one end supporting a plurality of heads and another end supporting a moving coil;

a magnetic circuit fixed to said base, said magnetic circuit constituting a voice coil motor in combination with said moving coil, said magnetic circuit comprising an E-shaped main yoke having an inner yoke, a center yoke, and an outer yoke, an inner magnet mounted on a surface of said inner yoke opposed to said center yoke, an outer magnet mounted on a surface of said outer yoke opposed to said center yoke, and a side yoke attached to said main yoke by magnetic forces of said inner magnet and said outer magnet; and a latch magnet fixed to one of said base and said magnetic circuit, for locking said actuator arm subassembly into an off-track position when the disk drive is not being operated and for improving flux density of the magnetic circuit near at least one of an inner and outer cylinder of the magnetic disk when the disk drive is executing on-track positioning, said latch magnet having a magnetic pole, said magnetic pole having the same polarity as that of surfaces of said inner magnet and said outer magnet opposed to said center yoke, said latch magnet being located at a position such that when said heads are disposed near one of the inner cylinder and an outer cylinder of a disk, said moving coil passes a magnetic flux directed from said latch magnet to said center yoke, to thereby strengthen a thrust of said voice coil motor.

2. A rotary actuator assembly in a disk drive unit according to claim 1, further comprising a magnetic member mounted on the other end of said actuator arm subassembly and adapted to be magnetically attracted to said latch magnet.

3. A rotary actuator assembly in a disk drive unit according to claim 1, further comprising a first stopper for stopping said actuator arm subassembly near an innermost cylinder of said disk and a second stopper for stopping said actuator arm subassembly near an outermost most cylinder of said disk.

4. A rotary actuator assembly in a disk drive unit according to claim 3, wherein said latch magnet locks said actuator arm subassembly at a position where said actuator arm subassembly is slightly separate from said first stopper in a seeking direction.

5. A rotary actuator assembly in a disk drive unit according to claim 3, wherein said latch magnet locks said actuator arm subassembly at a position where said actuator arm subassembly is slightly separate from said second stopper in a seeking direction.

6. A rotary actuator assembly in a disk drive unit according to claim 1, wherein said latch magnet comprises a plurality of latch magnets located at positions such that when said heads are disposed near one of said inner cylinder and said outer cylinder of said disks, said moving coil passes magnetic fluxes directed from said latch magnets to said center yoke.

7. A rotary actuator assembly in a disk drive unit according to claim 1, further comprising an auxiliary magnet for compensating a reduction in gap magnetic flux density in said magnetic circuit.

8. A rotary actuator assembly in a disk drive unit according to claim 7, wherein said moving coil has an effective portion parallel to an axis of rotation of said actuator arm subassembly and an ineffective portion perpendicular to said axis of rotation, and said auxiliary magnet generates a thrust at said ineffective portion of said moving coil.

9. A rotary actuator assembly in a disk drive unit according to claim 1, wherein said moving coil has an effective portion parallel to an axis of rotation of said actuator arm subassembly and an ineffective portion perpendicular to said axis of rotation, and said latch magnet generates a thrust at said ineffective portion of said moving coil.

10. A rotary actuator assembly in a disk drive unit according to claim 1, further comprising an elastic member mounted on an end of said latch magnet, for stopping said actuator arm subassembly.

11. A rotary actuator assembly in a disk drive unit according to claim 1, wherein a shallow groove extending in the same direction as that of winding of said moving coil is formed on said center yoke at a substantially central portion thereof, and a short coil formed of a highly conductive material is embedded in said shallow groove.

12. A rotary actuator assembly in a disk drive unit according to claim 11, wherein said shallow groove is a groove having a substantially V-shaped bottom surface.

13. A rotary actuator assembly in a disk drive unit according to claim 11, wherein said short coil is formed from at least one pressed member.

14. A rotary actuator assembly in a disk drive unit according to claim 13, wherein said pressed member comprises a U-shaped member and a flat member, said short coil being formed by crimping said U-shaped member and said flat member to each other.

15. A rotary actuator assembly in a disk drive unit according to claim 11, wherein said short coil is formed by winding a bare wire plural times in said shallow groove.

16. A rotary actuator assembly in a disk drive unit, comprising:

a base;

an actuator arm subassembly rotatably mounted on said base, said subassembly having one end supporting a plurality of heads and another end supporting a moving coil, said moving coil having an effective portion;

a magnetic circuit fixed to said base, said magnetic circuit constituting a voice coil motor in combination with said moving coil, said magnetic circuit comprising an E-shaped main yoke having an inner yoke, a center yoke, and an outer yoke, an inner magnet mounted on a surface of said inner yoke opposed to said center yoke, an outer magnet mounted on a surface of said outer yoke opposed to said center yoke, and a side yoke attached to said main yoke by magnetic forces of said inner magnet and said outer magnet, said magnetic circuit defining an inner gap between said center yoke and said inner magnet and an outer gap between said center yoke and said outer magnet, said center yoke being formed at its substantially central portion with a shallow groove extending in the same direction as that of winding of said moving coil; and a short coil embedded in said shallow groove, said short coil being formed of a highly conductive material, said short coil having a width such that when said moving coil is disposed at a position of the innermost cylinder or the outermost cylinder of a magnetic disk, the effective portion of the moving coil on the outer gap does not overlap said short coil.

17. A rotary actuator assembly in a disk drive unit according to claim 16, wherein said shallow groove is a groove having a substantially V-shaped bottom surface.

18. A rotary actuator assembly in a disk drive unit according to claim 16, wherein said short coil is formed from at least one pressed member.

19. A rotary actuator assembly in a disk drive unit according to claim 18, wherein said pressed member comprises a U-shaped member and a flat member, said short coil being formed by crimping said U-shaped member and said flat member to each other.

20. A rotary actuator assembly in a disk drive unit according to claim 16, wherein said short coil is formed by winding a bare wire plural times in said shallow groove.

* * * * *

UNITED STATES PATENT AND TRADEMARK OFFICE
CERTIFICATE OF CORRECTION

PATENT NO. : 5,666,244
DATED : Sept. 9, 1997
INVENTOR(S) : Yoshinori Ogawa

It is certified that error appears in the above-indentified patent and that said Letters Patent is hereby corrected as shown below:

Column 4, line 66, delete "7" and insert --57-- therefor.

Column 5, line 46, delete "Usually" and insert

--usually-- therefor.

Column 7, line 38, delete "64 a" and insert --64a-- therefor.

Column 7, line 43, delete "64 a" and insert --64a-- therefor.

UNITED STATES PATENT AND TRADEMARK OFFICE
CERTIFICATE OF CORRECTION

Page 2 of 2

PATENT NO. : 5,666,244
DATED : Sept. 9, 1997
INVENTOR(S) : Yoshinori Ogawa

It is certified that error appears in the above-indentified patent and that said Letters Patent is hereby corrected as shown below:

Column 8, line 22, delete "pap" and insert --gap-- therefor.

Column 8, line 30, delete "2" and insert --82-- therefor.

Column 8, line 36, delete "pap" and insert --gap-- therefor.

Signed and Sealed this

Eleventh Day of August 1998

Attest:

BRUCE LEHMAN

Attesting Officer

Commissioner of Patents and Trademarks